(12) United States Patent
Bhattacharjee et al.

(10) Patent No.: US 8,713,440 B2
(45) Date of Patent: Apr. 29, 2014

(54) TECHNIQUES TO MANAGE COMMUNICATIONS RESOURCES FOR A MULTIMEDIA CONFERENCE EVENT

(75) Inventors: Avronil Bhattacharjee, Redmond, WA (US); Pulin Thakkar, Redmond, WA (US); Kapil Sharma, Woodinville, WA (US); Noor-E-Gagan Singh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 12/030,866

(22) Filed: Feb. 13, 2008

(65) Prior Publication Data
US 2009/0204922 A1 Aug. 13, 2009

(51) Int. Cl.
*G06F 3/00* (2006.01)
(52) U.S. Cl.
USPC .......................................... 715/727; 715/753
(58) Field of Classification Search
USPC ................................................. 715/727, 753
See application file for complete search history.

(56) References Cited

U.S. PATENT DOCUMENTS

| | | | |
|---|---|---|---|
| 6,091,812 A * | 7/2000 | Iglehart et al. ................. | 379/308 |
| 6,636,487 B1 * | 10/2003 | Roy .............................. | 370/260 |
| 6,697,341 B1 * | 2/2004 | Roy .............................. | 370/260 |
| 6,760,754 B1 * | 7/2004 | Isaacs et al. .................. | 709/206 |
| 6,801,777 B2 * | 10/2004 | Rusch ......................... | 455/452.2 |
| 6,804,510 B1 * | 10/2004 | Bates et al. ................. | 455/414.4 |
| 6,868,080 B1 | 3/2005 | Umansky et al. | |
| 6,980,643 B2 | 12/2005 | Chen et al. | |
| 7,024,162 B2 * | 4/2006 | Muthuswamy et al. ... | 455/67.11 |
| 7,075,921 B2 | 7/2006 | Siegrist et al. | |
| 7,088,677 B1 | 8/2006 | Burst, Jr. et al. | |
| 7,209,473 B1 * | 4/2007 | Mohaban et al. ............. | 370/352 |
| 7,489,641 B2 * | 2/2009 | Miller et al. ................ | 370/241.1 |
| 7,558,239 B1 * | 7/2009 | Rasanen ....................... | 370/338 |
| 7,769,342 B2 * | 8/2010 | Tabe ........................... | 455/3.06 |
| 7,903,588 B2 * | 3/2011 | Rodman et al. .............. | 370/260 |
| 7,995,732 B2 * | 8/2011 | Koch et al. ............... | 379/204.01 |
| 2003/0091024 A1 | 5/2003 | Stumer | |
| 2003/0095541 A1 * | 5/2003 | Chang et al. .................. | 370/352 |
| 2004/0073641 A1 | 4/2004 | Minhazuddin et al. | |
| 2004/0085948 A1 * | 5/2004 | Cabana ........................ | 370/352 |
| 2006/0077968 A1 | 4/2006 | Pitsoulakis et al. | |
| 2006/0190594 A1 | 8/2006 | Jorgenson et al. | |

(Continued)

OTHER PUBLICATIONS

Nuera's GX-1K, http://www.nuera.com/pdfs/GX-1K.pdf, Sep. 22, 2007.

(Continued)

*Primary Examiner* — Ryan Pitaro
(74) *Attorney, Agent, or Firm* — Sonia Cooper; Jim Ross; Micky Minhas (57) ABSTRACT

Techniques to manage communications resources for a multimedia conference event are described. An apparatus may comprise an audio management component operative to manage multiple audio connections for a multimedia conference event. The audio management component may comprise an audio monitor module communicatively coupled to an audio message module. The audio monitor module may be operative to monitor multiple audio connections for the multimedia conference event, and determine at least one audio quality parameter for an audio connection is lower than a defined threshold value to form an audio quality warning state. The audio message module may be operative to generate an operator message with the audio quality warning state and one or more options to improve audio quality for the audio connection. Other embodiments are described and claimed.

20 Claims, 6 Drawing Sheets

(56) References Cited

U.S. PATENT DOCUMENTS

| | | |
|---|---|---|
| 2006/0198360 A1* | 9/2006 | Biage et al. .................. 370/352 |
| 2006/0251052 A1 | 11/2006 | Croak et al. |
| 2006/0252376 A1* | 11/2006 | Fok et al. .................. 455/67.13 |
| 2006/0256773 A1 | 11/2006 | Hume |
| 2008/0005691 A1* | 1/2008 | Malik et al. .................. 715/765 |
| 2009/0080411 A1* | 3/2009 | Lyman .................. 370/352 |
| 2010/0135481 A1* | 6/2010 | Frauenthal et al. ...... 379/406.06 |
| 2010/0182921 A1* | 7/2010 | Basart et al. .................. 370/252 |
| 2010/0203823 A1* | 8/2010 | Apaar .................. 455/3.06 |

OTHER PUBLICATIONS

Teles. VoIPBOX http://voipmonster.com/udocs/TELES.VoIPBOX_FX_flyer.pdf, Dec. 1, 2008.

VoIP Deployment in Enterprises http://searchvoip.techtarget.com/searchEnterpriseVoice/downloads/wileychapterMay05.pdf, May 2005.

* cited by examiner

MONITOR MULTIPLE AUDIO CONNECTIONS FOR A MULTIMEDIA CONFERENCE EVENT
*402*

DETERMINE AT LEAST ONE AUDIO QUALITY PARAMETER FOR AN AUDIO CONNECTION IS LOWER THAN A DEFINED THRESHOLD VALUE TO FORM AN AUDIO QUALITY WARNING STATE
*404*

GENERATE AN OPERATOR MESSAGE WITH THE AUDIO QUALITY WARNING STATE AND ONE OR MORE OPTIONS TO IMPROVE AUDIO QUALITY FOR THE AUDIO CONNECTION
*406*

TECHNIQUES TO MANAGE COMMUNICATIONS RESOURCES FOR A MULTIMEDIA CONFERENCE EVENT

BACKGROUND

A multimedia conferencing system typically allows multiple participants to communicate and share different types of media content in a collaborative and real-time meeting over a network. The multimedia conferencing system may display different types of media content using various graphical user interface (GUI) windows or views. For example, one GUI view might include video images of participants, another GUI view might include presentation slides, yet another GUI view might include text messages between participants, and so forth. In this manner various geographically disparate participants may interact and communicate information in a virtual meeting environment similar to a physical meeting environment where all the participants are within one room.

In a virtual meeting environment, however, it may become difficult to manage communications resources for the various participants of a meeting. For example, if a participant has a degraded audio connection, it may be difficult for the other participants to discern speech from the participant using the degraded connection. Furthermore, the degraded audio connection may produce static, feedback, echo, noise and other undesirable audio features for all the participants to hear. Typically, conventional systems force the participant to terminate the degraded audio connection, and leave it to the participant to attempt to join the virtual meeting environment using a different audio connection. This may be undesirable or infeasible. Techniques directed to improving techniques to manage communications resources in a virtual meeting environment may enhance user experience and convenience.

SUMMARY

Various embodiments may be generally directed to multimedia conference systems. Some embodiments may be particularly directed to techniques to manage communications resources for a multimedia conference event. The multimedia conference event may include multiple participants, some of which may gather in a conference room, while others may participate in the multimedia conference event from a remote location.

In one embodiment, for example, an apparatus such as a multimedia conferencing server may include an audio management component operative to manage multiple audio connections for a multimedia conference event. The audio management component may comprise an audio monitor module communicatively coupled to an audio message module. The audio monitor module may be operative to monitor multiple audio connections for the multimedia conference event, and determine at least one audio quality parameter for an audio connection is lower than a defined threshold value to form an audio quality warning state. The audio message module may be operative to generate an operator message with the audio quality warning state and one or more options to improve audio quality for the audio connection. Other embodiments are described and claimed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be generally directed to multimedia conferencing systems arranged to provide meeting and collaboration services to multiple participants over a network. Some multimedia conferencing systems may be designed to operate with various packet-based networks, such as the Internet or World Wide Web ("web"), to provide web-based conferencing services. Such implementations are sometimes referred to as web conferencing systems. An example of a web conferencing system may include MICROSOFT® OFFICE LIVE MEETING made by Microsoft Corporation, Redmond, Wash. Other multimedia conferencing systems may be designed to operate for a private network, business, organization, or enterprise, and may utilize a multimedia conferencing server such as MICROSOFT OFFICE COMMUNICATIONS SERVER made by Microsoft Corporation, Redmond, Wash. It may be appreciated, however, that implementations are not limited to these examples.

A multimedia conferencing system may include, among other network elements, a multimedia conferencing server or other processing device arranged to provide web conferencing services. For example, a multimedia conferencing server may include, among other server elements, a server meeting component operative to control and mix different types of media content for a meeting and collaboration event, such as a web conference. A meeting and collaboration event may refer to any multimedia conference event offering various types of multimedia information in a real-time or live online environment, and is sometimes referred to herein as simply a "meeting event," "multimedia event" or "multimedia conference event."

In one embodiment, the multimedia conferencing system may further include one or more computing devices implemented as meeting consoles. Each meeting console may be arranged to participate in a multimedia event by connecting to the multimedia conference server. Different types of media information from the various meeting consoles may be received by the multimedia conference server during the multimedia event, which in turn distributes the media information to some or all of the other meeting consoles participating in the multimedia event As such, any given meeting console may have a display with multiple media content views of different types of media content. In this manner various geographically disparate participants may interact and communicate information in a virtual meeting environment similar to a physical meeting environment where all the participants are within one room.

In a virtual meeting environment, however, it may become difficult to manage communications resources for the various participants of a meeting. For example, if a participant has a degraded audio connection, it may be difficult for the other participants to discern speech from the participant using the degraded connection. Furthermore, the degraded audio connection may produce static, feedback, echo, noise and other undesirable audio features for all the participants to hear. Typically, conventional systems force the participant to terminate the degraded audio connection, and leave it to the participant to attempt to join the virtual meeting environment using a different audio connection. This may be undesirable or infeasible.

To solve these and other problems, the embodiments may be directed to techniques to manage communications resources for a multimedia conference event. The communications resources may include, among others, audio communications resources. Audio communications resources may include any hardware elements of software elements directed to communicating audio information between meeting consoles for a multimedia conference event. Examples of audio communications resources may include without limitation various input audio devices, output audio devices, audio connections, communication interfaces, and so forth. The embodiments may manage the communications resources to improve communications of audio information, such as voice information, during a multimedia conference event. For example, the embodiments may implement various techniques to successively attempt to automatically heal or repair degraded audio connections between meeting terminals. In cases where audio connections may not be repairable, however, the embodiments may attempt to automatically or manually switch the degraded audio connection to a superior audio connection to improve voice quality. Additionally or alternatively, the embodiments may attempt to switch the input audio devices or output audio devices to suitable alternates to improve voice quality. These and other communications resources management techniques as described herein may allow a participant for a multimedia conference event to recover from poor audio quality and productively engage in the multimedia conference event. As a result, the communications resource management techniques can improve affordability, scalability, modularity, extendibility, or interoperability for an operator, device or network.

Figure 1:
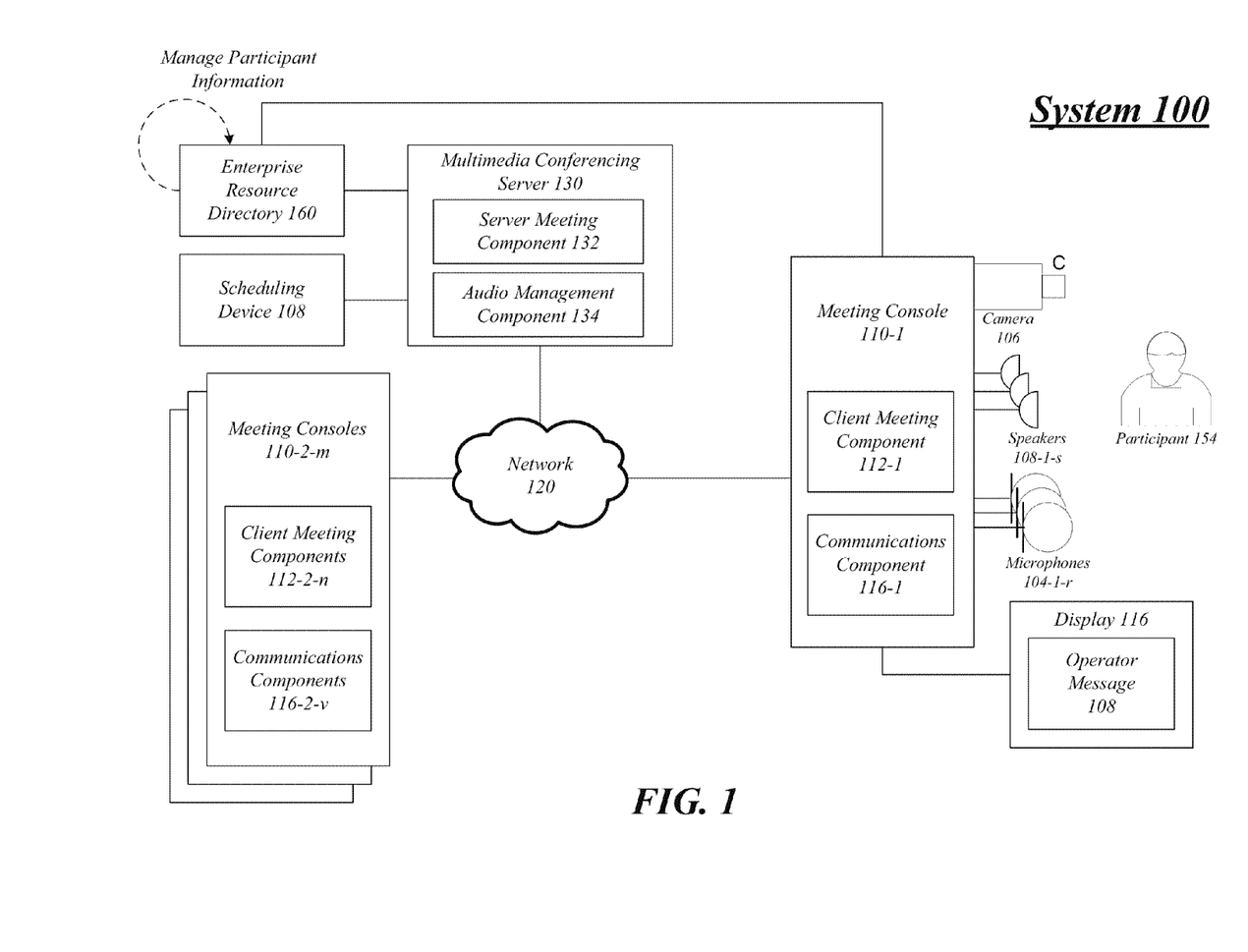
FIG. 1 illustrates an embodiment of a multimedia conferencing system.

FIG. 1 illustrates a block diagram for a multimedia conferencing system 100. Multimedia conferencing system 100 may represent a general system architecture suitable for implementing various embodiments. Multimedia conferencing system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although multimedia conferencing system 100 as shown in FIG. 1 has a limited number of elements in a certain topology, it may be appreciated that multimedia conferencing system 100 may include more or less elements in alternate topologies as desired for a given implementation. The embodiments are not limited in this context.

In various embodiments, the multimedia conferencing system 100 may comprise, or form part of, a wired communications system, a wireless communications system, or a combination of both. For example, the multimedia conferencing system 100 may include one or more elements arranged to communicate information over one or more types of wired communications links. Examples of a wired communications link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The multimedia conferencing system 100 also may include one or more elements arranged to communicate information over one or more types of wireless communications links. Examples of a wireless communications link may include, without limitation, a radio channel, infrared channel, radio-frequency (RF) channel, Wireless Fidelity (WiFi) channel, a portion of the RF spectrum, and/or one or more licensed or license-free frequency bands.

In various embodiments, the multimedia conferencing system 100 may be arranged to communicate, manage or process different types of information, such as media information and control information. Examples of media information may generally include any data representing content meant for a user, such as voice information, video information, audio information, image information, textual information, numerical information, application information, alphanumeric symbols, graphics, and so forth. Voice information may comprise a subset of audio information, and is broadly meant to include any information communicated by a human being, such as words, speech, speech utterances, sounds, vocal noise, and so forth. Control information may refer to any data representing commands, instructions or control words meant for an automated system. For example, control information may be used to route media information through a system, to establish a connection between devices, instruct a device to process the media information in a predetermined manner, and so forth.

In various embodiments, multimedia conferencing system 100 may include a multimedia conferencing server 130. The multimedia conferencing server 130 may comprise any logical or physical entity that is arranged to establish, manage or control a multimedia conference call between meeting consoles 110-1-*m* over a network 120. Network 120 may comprise, for example, a packet-switched network, a circuit-switched network, or a combination of both. In various embodiments, the multimedia conferencing server 130 may comprise or be implemented as any processing or computing device, such as a computer, a server, a server array or server farm, a work station, a mini-computer, a main frame computer, a supercomputer, and so forth. The multimedia conferencing server 130 may comprise or implement a general or specific computing architecture suitable for communicating and processing multimedia information. In one embodiment, for example, the multimedia conferencing server 130 may be implemented using a computing architecture as described with reference to FIG. 5. Examples for the multimedia conferencing server 130 may include without limitation a MICROSOFT OFFICE COMMUNICATIONS SERVER, a MICROSOFT OFFICE LIVE MEETING server, and so forth.

A specific implementation for the multimedia conferencing server 130 may vary depending upon a set of communication protocols or standards to be used for the multimedia conferencing server 130. In one example, the multimedia conferencing server 130 may be implemented in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. In another example, the multimedia conferencing server 130 may be implemented in accordance with the International Telecommunication Union (ITU) H.323 series of standards and/or variants. The H.323 standard defines a multipoint control unit (MCU) to coordinate conference call operations. In particular, the MCU includes a multipoint controller (MC) that handles H.245 signaling, and one or more multipoint processors (MP) to mix and process the data streams. Both the SIP and H.323 standards are essentially signaling protocols for Voice over Internet Protocol (VoIP) or Voice Over Packet (VOP) multimedia conference call operations. It may be appreciated that other signaling protocols may be implemented for the multimedia conferencing server 130, however, and still fall within the scope of the embodiments.

In general operation, multimedia conferencing system 100 may be used for multimedia conferencing calls. Multimedia conferencing calls typically involve communicating voice, video, and/or data information between multiple end points. For example, a public or private packet network 120 may be used for audio conferencing calls, video conferencing calls, audio/video conferencing calls, collaborative document sharing and editing, and so forth. The packet network 120 may also be connected to a Public Switched Telephone Network (PSTN) via one or more suitable VoIP gateways arranged to convert between circuit-switched information and packet information.

To establish a multimedia conferencing call over the packet network 120, each meeting console 110-1-*m* may connect to multimedia conferencing server 130 via the packet network 120 using various types of wired or wireless communications links operating at varying connection speeds or bandwidths, such as a lower bandwidth PSTN telephone connection, a medium bandwidth DSL modem connection or cable modem connection, and a higher bandwidth intranet connection over a local area network (LAN), for example.

In various embodiments, the multimedia conferencing server 130 may establish, manage and control a multimedia conference call between meeting consoles 110-1-*m*. In some embodiments, the multimedia conference call may comprise a live web-based conference call using a web conferencing application that provides full collaboration capabilities. The multimedia conferencing server 130 operates as a central server that controls and distributes media information in the conference. It receives media information from various meeting consoles 110-1-*m*, performs mixing operations for the multiple types of media information, and forwards the media information to some or all of the other participants. One or more of the meeting consoles 110-1-*m* may join a conference by connecting to the multimedia conferencing server 130. The multimedia conferencing server 130 may implement various admission control techniques to authenticate and add meeting consoles 110-1-*m* in a secure and controlled manner.

In various embodiments, the multimedia conferencing system 100 may include one or more computing devices implemented as meeting consoles 110-1-*m* to connect to the multimedia conferencing server 130 over one or more communications connections via the network 120. For example, a computing device may implement a client application that may host multiple meeting consoles each representing a separate conference at the same time. Similarly, the client application may receive multiple audio, video and data streams. For example, video streams from all or a subset of the participants may be displayed as a mosaic on the participant's display with a top window with video for the current active speaker, and a panoramic view of the other participants in other windows.

The meeting consoles 110-1-*m* may comprise any logical or physical entity that is arranged to participate or engage in a multimedia conferencing call managed by the multimedia conferencing server 130. The meeting consoles 110-1-*m* may be implemented as any device that includes, in its most basic form, a processing system including a processor and memory, one or more multimedia input/output (I/O) components, and a wireless and/or wired network connection. Examples of multimedia I/O components may include audio I/O components (e.g., microphones, speakers), video I/O components (e.g., video camera, display), tactile (I/O) components (e.g., vibrators), user data (I/O) components (e.g., keyboard, thumb board, keypad, touch screen), and so forth. Examples of the meeting consoles 110-1-*m* may include a telephone, a VoIP or VOP telephone, a packet telephone designed to operate on the PSTN, an Internet telephone, a video telephone, a cellular telephone, a personal digital assistant (PDA), a combination cellular telephone and PDA, a mobile computing device, a smart phone, a one-way pager, a two-way pager, a messaging device, a computer, a personal computer (PC), a desktop computer, a laptop computer, a notebook computer, a hand-held computer, a network appliance, and so forth. In some implementations, the meeting consoles 110-1-*m* may be implemented using a general or specific computing architecture similar to the computing architecture described with reference to FIG. 5.

The meeting consoles 110-1-*m* may comprise or implement respective client meeting components 112-1-*n*. The client meeting components 112-1-*n* may be designed to interoperate with the server meeting component 132 of the multimedia conferencing server 130 to establish, manage or control a multimedia conferencing event. For example, the client meeting components 112-1-*n* may comprise or implement the appropriate application programs and user interface controls to allow the respective meeting consoles 110-1-*m* to participate in a web conference facilitated by the multimedia conferencing server 130. This may include input equipment (e.g., video camera, microphone, keyboard, mouse, controller, etc.) to capture media information provided by the operator of a meeting console 110-1-*m*, and output equipment (e.g., display, speaker, etc.) to reproduce media information by the operators of other meeting consoles 110-1-*m*. Examples for client meeting components 112-1-*n* may include without limitation a MICROSOFT OFFICE COMMUNICATOR or the MICROSOFT OFFICE LIVE MEETING Windows Based Meeting Console, and so forth.

As shown in the illustrated embodiment of FIG. 1, a representative meeting console 110-1 may be connected to various multimedia input devices and/or multimedia output devices capable of capturing, communicating or reproducing multimedia information. The multimedia input devices may comprise any logical or physical device arranged to capture or receive as input multimedia information from one or more operators or participants of the meeting console 110-1, including audio input devices, video input devices, image input devices, text input devices, and other multimedia input equipment. Examples of multimedia input devices may include without limitation video cameras, microphones, microphone arrays, conference telephones, whiteboards, interactive whiteboards, voice-to-text components, text-to-voice components, voice recognition systems, pointing devices, keyboards, touchscreens, tablet computers, handwriting recognition devices, and so forth. An example of a video camera may include a ringcam, such as the MICROSOFT ROUNDTABLE made by Microsoft Corporation, Redmond, Wash. The MICROSOFT ROUNDTABLE is a videoconferencing device with a 360 degree camera that provides remote meeting participants a panoramic video of everyone sitting around a conference table. The multimedia output devices may comprise any logical or physical device arranged to reproduce or display as output multimedia information to one or more operators or participants of the meeting consoles 110-1, including audio output devices, video output devices, image output devices, text input devices, and other multimedia output equipment. Examples of multimedia output devices may include without limitation electronic displays, video projectors, speakers, vibrating units, printers, facsimile machines, and so forth.

In the illustrated embodiment shown in FIG. 1, the representative meeting console 110-1 may include various multimedia input devices arranged to capture media content from one or more participants 154-1-*p*, and stream the media content to the multimedia conferencing server 130. The meeting console 110-1 includes various types of multimedia input equipment, such as a video camera 106 and an array of microphones 104-1-*r*. The video camera 106 may capture video content including video content of one or more participants 154-1-*p* within video capture range of the video camera 106, and stream the video content to the multimedia conferencing server 130 via the meeting console 110-1. Similarly, audio input devices such as the array of microphones 104-1-*r* may capture audio content including audio content from one or more participants 154-1-*p* within audio capture range of the microphones 104-1-*r*, and stream the audio content to the multimedia conferencing server 130 via the meeting console 110-1. The meeting console may also include various multimedia output devices, such as one or more speakers 108-1-*s* and an electronic display 116. Audio output devices such as the one or more speakers 108-1-*s* may reproduce audio content for the participants 154-1-*p*. Video output devices such as the electronic display 116 may be used to reproduce video content from other participants using remote meeting consoles 110-2-*m* received via the multimedia conferencing server 130.

The meeting consoles 110-1-*m* and the multimedia conferencing server 130 may communicate media information and control information utilizing various media connections established for a given multimedia conference event. In one embodiment, for example, the meeting consoles 110-1-*m* may each comprise a respective communications component 116-1-*v*. The communications components 116-1-*v* may comprise various communications resources suitable for establishing the various media connections. Examples of the communications resources may include transmitters, receivers, transceivers, radios, network interfaces, network interface cards, processors, memory, media access control (MAC) layer parts, physical (PHY) layer parts, connectors, communications media, communications interfaces, and so forth.

The communications components 116-1-*v* may establish media connections in general, and audio connections in particular, using various VoIP signaling protocols, such as the SIP series of protocols. The SIP series of protocols are application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these. SIP is designed as part of the overall IETF multimedia data and control architecture currently incorporating protocols such as the resource reservation protocol (RSVP) (IEEE RFC 2205) for reserving network resources, the real-time transport protocol (RTP) (IEEE RFC 1889) for transporting real-time data and providing Quality-of-Service (QOS) feedback, the real-time streaming protocol (RTSP) (IEEE RFC 2326) for controlling delivery of streaming media, the session announcement protocol (SAP) for advertising multimedia sessions via multicast, the session description protocol (SDP) (IEEE RFC 2327) for describing multimedia sessions, and others. For example, the meeting consoles 110-1-*m* may use SIP as a signaling channel to setup the media connections, and RTP as a media channel to transport media information over the media connections.

The communications components 116-1-*v* may establish media connections using various circuit-switched techniques. For example, the communications components 116-1-*v* may establish a media connection using Pulse Code Modulation (PCM) signals over a circuit-switched network. An example of a circuit-switched network may include the Public Switched Telephone Network (PSTN), a private network, and so forth.

Among the various media connections used to join the virtual room, the communications components 116-1-*v* may be particularly arranged to establish an audio connection. The audio connection may comprise a physical or logical connection used to communicate audio information, including voice information. The audio information may originate from one or more of the audio input devices connected to the meeting terminal 110-1-*m*, and terminate at one or more of the audio output devices connected to the meeting terminals 110-1-*m*. The audio connection may be established over various types of networks using any number of different communications protocols.

In general operation, a schedule device 108 may be used to generate a multimedia conference event reservation for the multimedia conferencing system 100. The scheduling device 108 may comprise, for example, a computing device having the appropriate hardware and software for scheduling multimedia conference events. For example, the scheduling device 108 may comprise a computer utilizing MICROSOFT OFFICE OUTLOOK® application software, made by Microsoft Corporation, Redmond, Wash. The MICROSOFT OFFICE OUTLOOK application software comprises messaging and collaboration client software that may be used to schedule a multimedia conference event. An operator may use MICROSOFT OFFICE OUTLOOK to convert a schedule request to a MICROSOFT OFFICE LIVE MEETING event that is sent to a list of meeting invitees. The schedule request may include a hyperlink to a virtual room for a multimedia conference event. An invitee may click on the hyperlink, and the meeting console **110-1-*m* launches a web browser, connects to the multimedia conferencing server 130**, and joins the virtual room. Once there, the participants can present a slide presentation, annotate documents or brainstorm on the built in whiteboard, among other tools.

In a virtual meeting environment, however, it may become difficult to manage communications resources for the various participants of a meeting. For example, if a participant has a degraded audio connection, it may be difficult for the other participants to discern speech from the participant using the degraded connection. Furthermore, the degraded audio connection may produce static, feedback, echo, noise and other undesirable audio features for all the participants to hear. Typically, conventional systems force the participant to terminate the degraded audio connection, and leave it to the participant to attempt to manually join the virtual meeting environment using a different audio connection.

To solve these and other problems, the multimedia conferencing server 130 may include an audio management component 134 communicatively coupled to the server meeting component 132. The audio management component 134 may implement various techniques to manage communications resources for various meeting consoles **110-1-*m* participating in a multimedia conference event. The communications resources may include, among others, audio communications resources. Audio communications resources may include any hardware elements of software elements directed to communicating audio information between meeting consoles for a multimedia conference event, including those implemented for the communications components 116-1-*v*. Examples of audio communications resources may include without limitation various input audio devices, output audio devices, audio connections, communications interfaces, and so forth as described with reference to the meeting console 110-1**.

The audio management component 134 may manage the communications resources to improve communications of audio information, such as voice information, during a multimedia conference event. For example, the audio management component 134 may implement various techniques to successively attempt to automatically heal or repair degraded audio connections between meeting terminals. In cases where audio connections may not be repairable, the audio management component 134 may attempt to automatically or manually switch the degraded audio connection to a superior audio connection to improve voice quality. Additionally or alternatively, the audio management component 134 may attempt to switch the input audio devices or output audio devices to suitable alternates to improve voice quality. These and other communications resources management techniques may allow a participant for a multimedia conference event to recover from poor audio quality and productively engage in the multimedia conference event. The audio management component 134 may be described in more detail with reference to FIG. 2.

Figure 2:
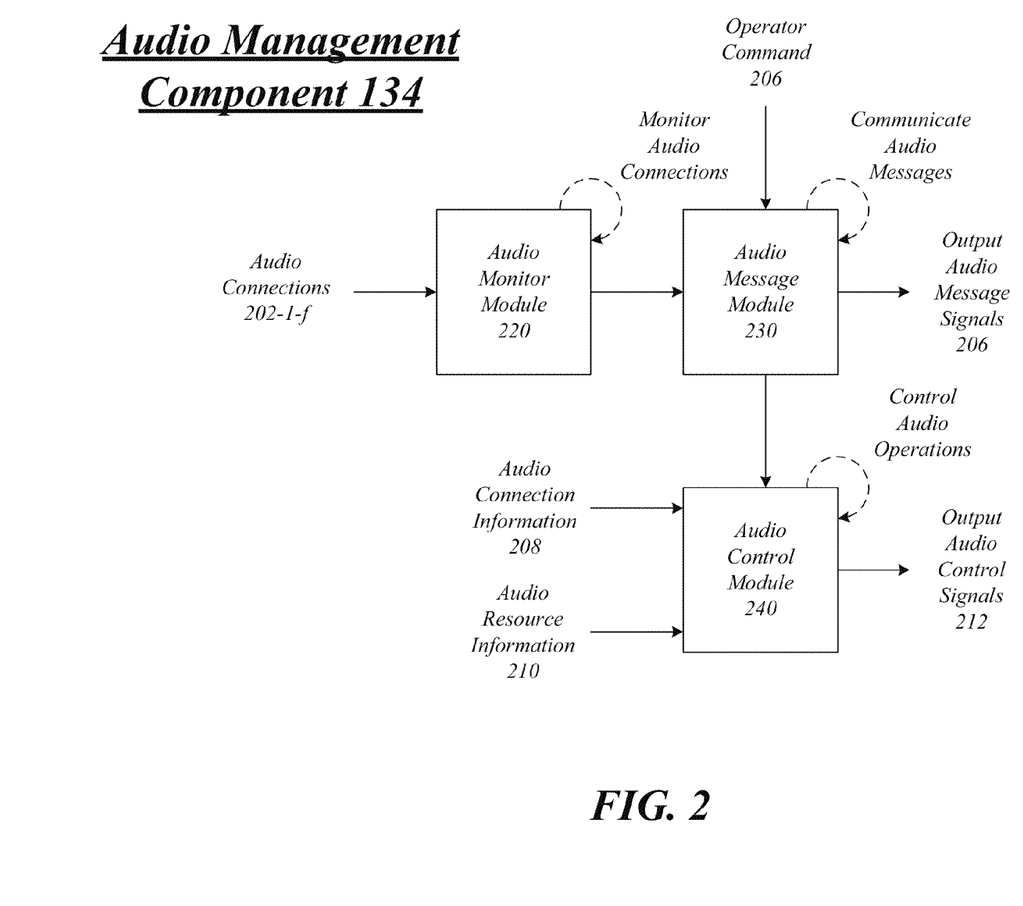
FIG. 2 illustrates an embodiment of an audio management component.

FIG. 2 illustrates a block diagram for the audio management component 134. The audio management component 134 may comprise multiple modules. The modules may be implemented using hardware elements, software elements, or a combination of hardware elements and software elements. Although the audio management component 134 as shown in FIG. 2 has a limited number of elements in a certain topology, it may be appreciated that the audio management component 134 may include more or less elements in alternate topologies as desired for a given implementation. The embodiments are not limited in this context.

In the illustrated embodiment shown in FIG. 2, the audio management component 134 includes an audio monitor module 220. The audio monitor module 220 may be arranged to monitor one or more audio connections **202-1-*f* for a multimedia conference event serviced by the multimedia conferencing server 130. The audio connections 202-1-*f* may represent various audio connections established between various meeting consoles 110-1-*m* participating in the multimedia conference event. The audio monitor module 220 may also be arranged to monitor one or more audio resources for a meeting console 110-1-*m* used for the one or more audio connections 202-1-*f***.

The audio monitor module 220 may determine at least one audio quality parameter for an audio connection **202-1-*f* is lower than a defined threshold value to form an audio quality warning state. The audio monitor module 220 may be arranged to monitor various real time quality indicators using certain heuristics. If the audio quality falls below a predefined threshold then it will surface the various options for the user to improve the audio performance. For example, the audio monitor module 220 may monitor various audio quality parameters. The audio quality parameters may include by way of example and not limitation a connectivity parameter, an incoming packet loss parameter, an outgoing packet loss parameter, a latency parameter, a jitter parameter, a signal-to-noise ratio parameter, and so forth. Each audio quality parameter may have a corresponding defined threshold value. If one or more of the audio quality parameters fall below the defined threshold values for an audio connection 202-1-*f* then the audio connection 202-1-*f* may enter an audio quality warning state. The audio quality warning state is a state where audio quality has deteriorated or been compromised sufficiently to warrant subsequent handling actions by the multimedia conferencing server 130 and/or the appropriate meeting consoles 110-1-*m*** (e.g., sending and/or receiving meeting consoles) to improve audio quality.

The audio monitor module 220 may also be arranged to monitor one or more audio resources for a meeting console **110-1-*m* used for the one or more audio connections 202-1-*f*. An audio resource may comprise various types multimedia equipment coupled to a meeting console 110-1-*m*, such as the multimedia input devices and multimedia output devices described with reference to FIG. 1. For example, the meeting console 110-1 includes various audio resources such as multiple microphones 104-1-*r* and multiple speakers 108-1-*s*. The audio monitor module 220 may monitor the multiple microphones 104-1-*r* and the multiple speakers 108-1-*s* using various audio device parameters and defined threshold values appropriate for such devices. The audio device parameters may include by way of example and not limitation power levels, echo, measured background noise, feedback, and so forth. If one or more of the audio device parameters fall below the defined threshold values for an audio resource, then the audio connection 202-1-*f*** may enter an audio quality warning state based in part from degradation in performance of the audio resource.

The audio management component 134 may further comprise an audio message module 230 communicatively coupled to the audio monitor module 220. The audio message module 230 may be arranged to generate an operator message 108 with the audio quality warning state and one or more options to improve audio quality for the audio connection. For example, the audio message module 230 may receive a message from the audio monitor module 220 indicating that one or more of the audio quality parameters have been violated and an audio connection 202-1-$f$ has entered an audio quality warning state. The audio message module 230 may then generate output audio message signals 206 for the operator message 108. A GUI component for the server meeting module 132 or an operating system for the multimedia conferencing server 130 may receive the output audio message signals 206, and generate the operator message 108 for display by the display 116. The operator message 108 may be designed to surface the problem and possible solutions to the viewer or operator of the meeting console 110-1-$m$. Examples for the operator message 108 may be described in more detail with reference to FIG. 3.

The audio message module 230 may receive an operator command 206 from the viewer or operator receiving the operator message 108. The operator command 206 may correspond to a selection of one of the presented options provided by the operator message 108. This may include traversing a series of GUI views providing additional information, options or solutions to address the audio quality warning state.

The audio management component 134 may further comprise an audio control module 240 communicatively coupled to the audio message module 230. The audio control module may be arranged to switch to an alternate audio connection or an alternate audio resource to improve audio quality in response to the operator command 206.

In one embodiment, for example, the audio control module 240 may receive a message from the audio message module 230 forwarding an operator command 206 to switch to an alternate audio connection. In this case, the audio control module 240 may communicate with the communications component 116 to determine whether any alternate communication interfaces are available to form an alternate audio connection. For example, assume a current audio connection 202-1 comprises a VoIP audio connection that has entered an audio quality warning state. The audio control module 240 may generate and send a request to the communications component 116 to provide audio connection information 208. The audio connection information 208 may comprise, for example, a list of available communications interfaces. The communications component 116 may perform a status check, and provide a list of available communications interfaces that include a PSTN communications interface and a wireless communications interface. The audio control module 240 may generate and send a control directive for the communications component 116 to switch to either the PSTN communications interface or the wireless communications interface. The decision to switch to a particular communications interface may be handled in according with any number of factors, including user-defined rules, signal strength, cost, quality of service requirements, latency parameters, bandwidth, and so forth. The communications component 116 may receive the control directives, and establish a new audio connection 202-2 with the selected communications interface.

The audio message module 230 may generate the operator message 108 with various options, including an option to form a new audio connection 202-1-$f$ using a predefined or operator provided contact number. In one embodiment, for example, the audio message module 230 may generate the operator message 108 with an option to switch to an alternate audio connection using a predefined contact number for the alternate audio connection. If this option is selected, the audio message module 230 may receive an operator command to switch to an alternate audio connection using the predefined contact number. In one embodiment, for example, the audio message module 230 may generate the operator message 108 with an option to switch to an alternate audio connection and a request to provide a contact number for the alternate audio connection. If this option is selected, the audio message module 230 may receive an operator command to switch to the alternate audio connection using the provided contact number.

Additionally or alternatively, the audio control module 240 may receive a message from the audio message module 230 forwarding an operator command 206 to switch to an alternate audio resource. For example, assume the audio monitor module 220 receives audio resource information 210 from the various device drivers for the audio resources. The audio monitor module 220 may determine from the audio resource information 210 that the microphone 104-1 is providing sufficient feedback noise to create an audio quality warning state for the audio connection 202-1. Rather than switching to an alternate audio connection (e.g., 202-2), the audio control module 240 may receive a message from the audio message module 230 forwarding an operator command 206 to switch to an alternate microphone 104-2. The audio control module 240 may generate and send a control directive to the microphone device driver to switch to the alternate microphone 104-2. The microphone device driver may receive the control directive, and switch to the alternate microphone 104-2 while maintaining the audio connection 202-1.

Figure 3:
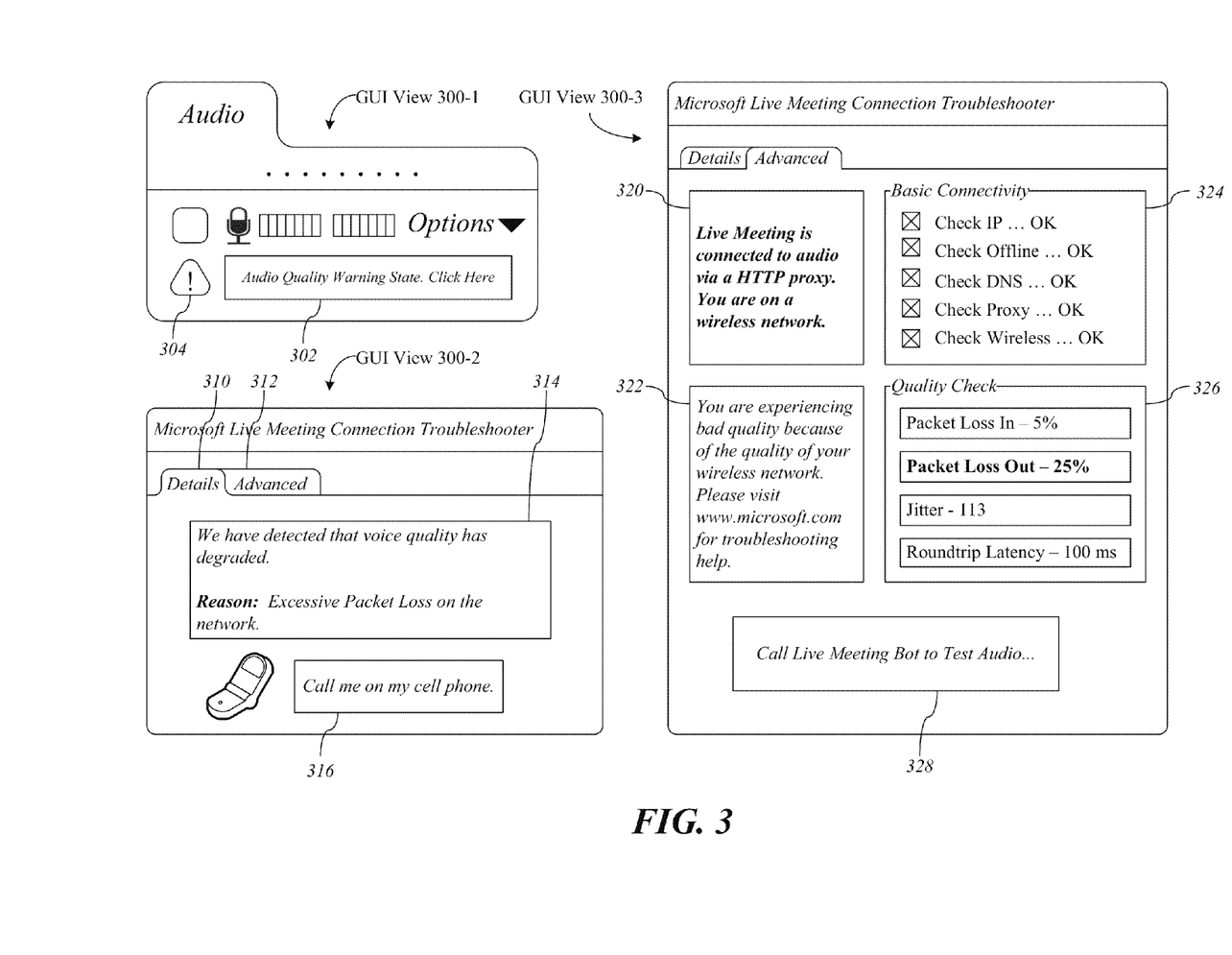
FIG. 3 illustrates an embodiment of various graphical user interface views.

FIG. 3 illustrates various GUI views 300-1-$j$. The various GUI views 300-1-$j$ may provide examples for GUI views suitable for use as the operator message 108. Each of the GUI views 300-1-$j$ may comprise various user interface elements for displaying options and/or information to an operator. It may be appreciated that the GUI views 300-1-$j$ are merely examples of the type of GUI views that may be used to surface audio quality problems and provide various options to improve audio quality during an ongoing multimedia conference event.

In the illustrated embodiment shown in FIG. 3, the GUI view 300-1 may represent a first GUI view providing an initial message box 302 with a message indicating that an audio quality warning state has occurred. The GUI view 300-1 may comprise, among other features, an icon 304 that when selected may be used to spawn or generate the GUI view 300-2 with additional options and/or information.

The GUI view 300-2 may represent a second GUI view providing a connection troubleshooter to assist an operator through the various options available to improve audio quality in response to the audio quality warning state message. The GUI view 300-2 may include a "Details" tab 312 and an "Advanced" tab 314. When the Details tab 312 is selected by an operator, a text box 314 may appear with a first message generated by the audio message module 230. In the illustrated embodiment shown in FIG. 3, the text box 314 may include a message describing an audio quality warning state (e.g., "We have detected that voice quality has degraded") and a reason for the audio quality warning state (e.g., "Excessive packet loss on the network"). The Details tab 312 may further display an option button 316 with a label indicating an option to establish and use an alternate audio connection 202-1-$f$ (e.g., "Call me on my cell phone").

The GUI view 300-3 may represent a third GUI view providing the connection troubleshooter with more advanced options to assist an operator through the various options available to improve audio quality in response to the audio quality warning state message. When the Advanced tab 314 is selected by an operator, the text boxes 320, 322, 324, 326 may appear with additional messages generated by the audio message module 230. In the illustrated embodiment shown in FIG. 3, the text box 320 may include a message describing features or characteristics of a current audio connection 202-1-$f$ the text box 322 may include a message describing potential reasons why the current audio connection 202-1-$f$ is degrading, the text box 324 may include various messages indicating basic connectivity information, and the text box 326 may include various messages indicating quality check information. In addition to the various text boxes 320 through 326, the Advanced tab 314 may further display an option button 328 with a label indicating an option to test audio quality using an automated audio recording and playback system implemented by the multimedia conferencing server 130. By way of example and not limitation, an operator may select option buttons 316, 328 to generate the operator command 206 received by the audio message module 230.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
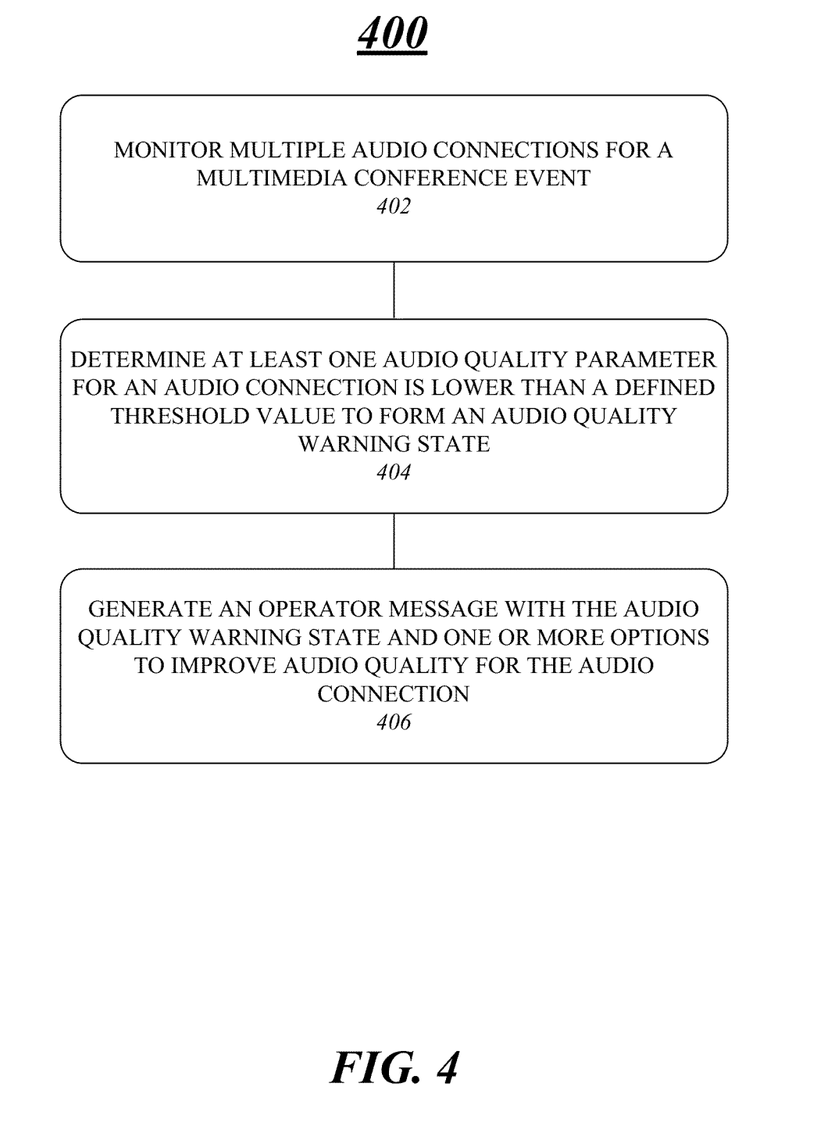
FIG. 4 illustrates an embodiment of a logic flow.

FIG. 4 illustrates one embodiment of a logic flow 400. Logic flow 400 may be representative of some or all of the operations executed by one or more embodiments described herein.

As shown in FIG. 4, the logic flow 400 may monitor multiple audio connections for a multimedia conference event at block 402. For example, the audio monitor module 220 may monitor multiple audio connections 202-1-$f$ for a multimedia conference event. The audio monitor module 220 may measure or generate statistics for various features or characteristics of the audio connections 202-1-$f$, and compare the measured statistics with corresponding static or dynamic threshold values. The audio monitor module 220 may monitor the audio connections 202-1-$f$ on a continuous, periodic or on-demand basis as desired for a given implementation.

The logic flow 400 may determine at least one audio quality parameter for an audio connection is lower than a defined threshold value to form an audio quality warning state at block 404. The audio monitor module 220 may compare the measured statistics with the various defined threshold values, and determine whether one or more of the audio quality parameters for a given audio connection 202-1-$f$ is lower than a corresponding defined threshold value to form an audio quality warning state. As an option, the audio monitor module 220 may be configured with varying numbers of audio quality parameters that need to drop below the corresponding defined threshold values prior to entering an audio quality warning state. For example, a lower number of audio quality parameters may need to be triggered to increase sensitivity of the audio connection 202-1-$f$ to fluctuations in audio quality, while a higher number of audio quality parameters may need to be triggered to decrease such sensitivity. Furthermore, guard intervals may be implemented around the defined threshold values to vary sensitivity as well. For example, an audio quality parameter may need to drop below the defined threshold value by a smaller guard interval prior to forming the audio quality warning state to increase sensitivity, and by a larger guard interval to decrease sensitivity.

The logic flow 400 may generate an operator message with the audio quality warning state and one or more options to improve audio quality for the audio connection at block 406. For example, whenever the audio monitor module 220 determines that one or more of the audio quality parameters have dropped below their corresponding defined thresholds, audio monitor module 220 may output a signal or message to the audio message module 230. The audio message module 230 may receive the signal or message from the audio monitor module 220, and generate the output audio message signals 206 for the operator message 108 with the audio quality warning state and one or more options to improve audio quality for the audio connection 202-1-$f$.

In various embodiments, the options may include switching to an alternate audio connection 202-1-$f$ to improve audio quality in response to the operator command 206. For example, the audio message module 230 may generate the operator message 108 with an option to switch to an alternate audio connection 202-2 using a predefined contact number for the alternate audio connection, and receive the operator command 206 to switch to an alternate audio connection 202-2 using a predefined (or known) contact number for the alternate audio connection in response to the operator message. The audio message module 230 may output a signal or message to the audio control module 240. The audio control module 240 may receive the signal or message, and issue control directives to the communications component 116 to switch from the current audio connection 202-1 to an alternate audio connection 202-2 using the predefined contact number for the alternate audio connection 202-2 in response to the operator message. The communications component 116 may receive the control directives from the audio control module 240, and establish the alternate audio connection 202-2 using the appropriate communications interface and the predefined contact number.

Additionally or alternatively, the audio message module 230 may generate the operator message 108 with an option to switch to an alternate audio connection 202-3 and a request to provide a contact number for the alternate audio connection 202-3. The audio message module 230 may receive the operator command 206 to switch to an alternate audio connection 202-3 using the operator provided contact number for the alternate audio connection 202-3 in response to the operator message 108. The audio message module 230 may output a signal or message to the audio control module 240. The audio control module 240 may receive the signal or message, and issue control directives to the communications component 116 to switch from the current audio connection 202-1 to an alternate audio connection 202-3 using the operator provided contact number for the alternate audio connection 202-3 in response to the operator message. The communications component 116 may receive the control directives from the audio control module 240, and establish the alternate audio connection 202-3 using the appropriate communications interface and the operator provided contact number.

In some cases, the audio monitor module 220 and/or the audio control module 240 may determine that an audio resource creating the audio quality warning state is an input device, an output device or a network connection. This may be accomplished, for example, using the audio resource information 210 as provided by a meeting console 110-1-*m* and/or another component of the multimedia conferencing server 130. The audio message module 230 may generate the operator message 108 with the audio quality warning state, an identifier for the audio resource creating the audio quality warning state, and an option to switch from the audio resource to an alternate audio resource. For example, the option may be to switch from a current microphone 104-1 to an alternate microphone 104-2, a current speaker 108-1 to an alternate speaker 108-2, and so forth.

Figure 5:
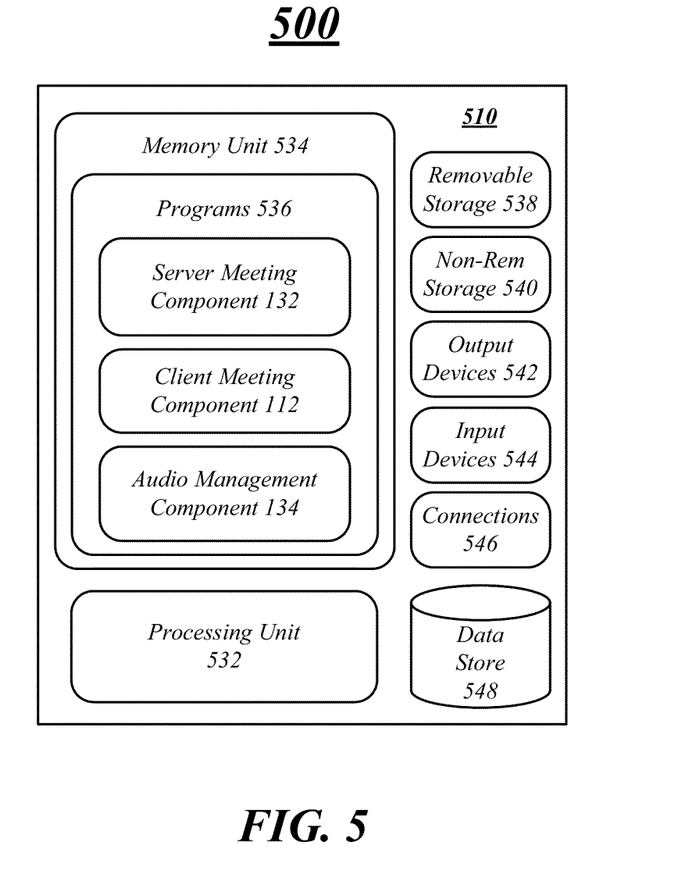
FIG. 5 illustrates an embodiment of a computing architecture.

FIG. 5 further illustrates a more detailed block diagram of computing architecture 510 suitable for implementing the meeting consoles 110-1- or the multimedia conferencing server 130. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more application programs 536-1-*t* and accompanying data. Depending on the implementation, examples of application programs 536-1-*t* may include server meeting component 132, client meeting components 112-1-*n*, or audio management component 134.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may be representative of, for example, the communications interfaces for the communications components 116-1-*v*. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
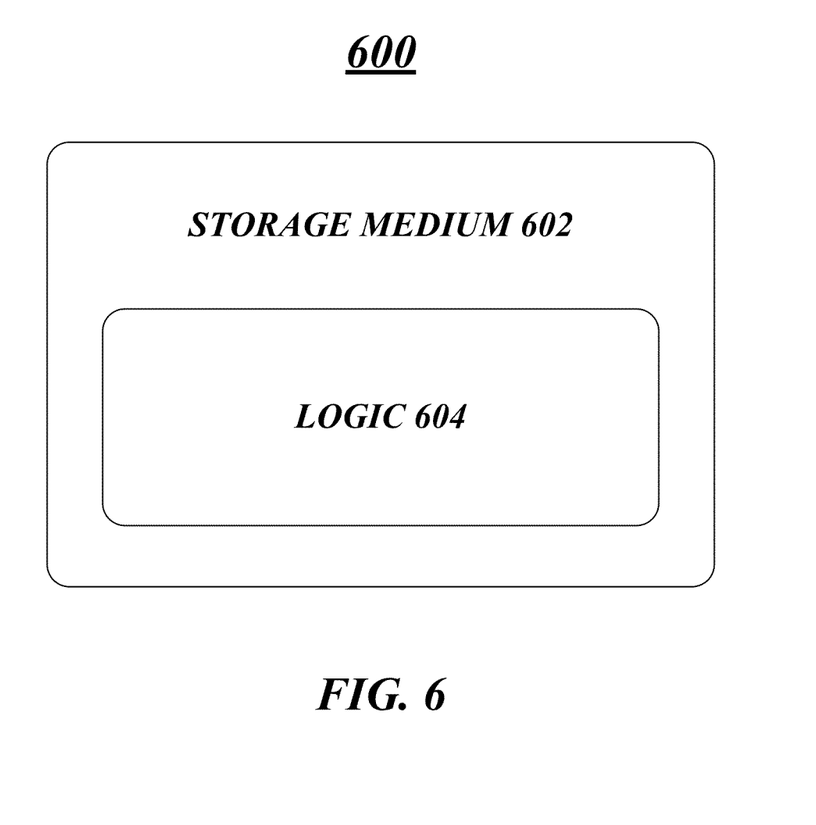
FIG. 6 illustrates an embodiment of an article.

FIG. 6 illustrates a diagram an article of manufacture 600 suitable for storing logic for the various embodiments, including the logic flow 400. As shown, the article 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   monitoring multiple audio connections established among multiple meeting consoles for a multimedia conference event;
   monitoring an audio connection quality parameter and an audio device parameter for at least one audio resource used for at least one of the audio connections, an audio resource comprising at least one of: a multimedia input device and a multimedia output device;
   determining that at least one of: the audio connection quality parameter for an audio connection is lower than a defined threshold value and the audio device parameter of the at least one audio resource is lower than a second defined threshold value, to form an audio quality warning state;
   determining whether any alternate communication interfaces are available to form an alternate audio connection to the multimedia conference event; and
   generating an operator message with the audio quality warning state and options to improve audio quality for the audio connection, the options comprising at least: an option to switch to the determined alternate audio connection, the determined alternate audio connection for transmitting voice information of a participant in the multimedia conference event, and an option to switch to an alternate audio resource.

2. The method of claim 1, comprising switching to the determined alternate audio connection to improve audio quality in response to an operator command.

3. The method of claim 1, comprising generating the operator message with the option to switch to the determined alternate audio connection using a predefined contact number for the alternate audio connection.

4. The method of claim 1, comprising receiving an operator command to switch to the determined alternate audio connection using a predefined contact number for the alternate audio connection in response to the operator message.

5. The method of claim 1, comprising switching to the determined alternate audio connection using a predefined contact number for the alternate audio connection in response to the operator message.

6. The method of claim 1, comprising generating the operator message with the option to switch to the determined alternate audio connection and a request to provide a contact number for the alternate audio connection.

7. The method of claim 1, comprising receiving an operator command to switch to the determined alternate audio connection using a contact number for the alternate audio connection provided in response to the operator message.

8. The method of claim 1, comprising switching to the determined alternate audio connection using a contact number for the alternate audio connection provided in response to the operator message.

9. The method of claim 1, comprising determining an audio resource creating the audio quality warning state is an input device, an output device or a network connection.

10. The method of claim 1, comprising generating the operator message with the audio quality warning state, an audio resource creating the audio quality warning state, and an option to switch from the audio resource to an alternate audio resource.

11. An article comprising a storage medium containing instructions that if executed enable a system to:
   monitor multiple audio connections established among multiple meeting consoles for a multimedia conference event;
   monitor multiple audio connection quality parameters and an audio device parameter for at least one audio resource used for at least one of the audio connections, an audio resource comprising at least one of: a multimedia input device and a multimedia output device;
   compare the multiple audio connection quality parameters for each audio connection to corresponding defined threshold values;
   compare the audio device parameter of the at least one audio resource to a corresponding second defined threshold value;
   determine that at least one of: the audio connection quality parameter for an audio connection is lower than a defined threshold value and the audio device parameter of the at least one audio resource is lower than the second defined threshold value, to form an audio quality warning state;
   determine whether any alternate communication interfaces are available to form an alternate audio connection to the multimedia conference event; and
   generate an operator message with the audio quality warning state and options to improve audio quality for the audio connection, the options comprising at least: an option to switch to the determined alternate audio connection, the determined alternate audio connection for voice information of a participant in the multimedia conference event, and an option to switch to an alternate audio resource.

12. The article of claim 11, further comprising instructions that if executed enable the system to:
generate the operator message with the option to switch to the determined alternate audio connection using a predefined contact number for the alternate audio connection;
receive an operator command to switch to an alternate audio connection using the predefined contact number; and
switch to the alternate audio connection using the predefined contact number in response to the operator message.

13. The article of claim 11, further comprising instructions that if executed enable the system to:
generate the operator message with the option to switch to the determined alternate audio connection and a request to provide a contact number for the alternate audio connection;
receive an operator command to switch to the alternate audio connection using the provided contact number; and
switch to the alternate audio connection using the provided contact number in response to the operator message.

14. The article of claim 11, further comprising instructions that if executed enable the system to:
determine an audio resource creating the audio quality warning state is an input device, an output device or a network connection; and
generate the operator message with the audio quality warning state, an audio resource creating the audio quality warning state, and an option to switch from the audio resource to an alternate audio resource.

15. An apparatus, comprising:
a processing unit;
a memory, coupled to the processing unit, storing instructions that, when executed, implement:
an audio management component operative to manage multiple audio connections established among multiple meeting consoles for a multimedia conference event, the audio management component comprising:
an audio monitor module operative to monitor multiple audio connections for the multimedia conference event, monitor an audio connection quality parameter and an audio device parameter for at least one audio resource used for at least one of the audio connections, an audio resource comprising at least one of: a multimedia input device and a multimedia output device, determine that at least one of: the audio connection quality parameter for an audio connection is lower than a defined threshold value and the audio device parameter of the at least one audio resource is lower than a second defined threshold value, to form an audio quality warning state, and determine whether any alternate communication interfaces are available to form an alternate audio connection to the multimedia conference event; and
an audio message module communicatively coupled to the audio monitor module, the audio message module operative to generate an operator message with the audio quality warning state and options to improve audio quality for the audio connection, the options comprising at least: an option to switch to the determined alternate audio connection, the determined alternate audio connection for transmitting voice information of a participant in the multimedia conference event, and an option to switch to an alternate audio resource.

16. The apparatus of claim 15, the audio connection quality parameters comprising a connectivity parameter, an incoming packet loss parameter, an outgoing packet loss parameter, a latency parameter, a jitter parameter, and a signal-to-noise ratio parameter.

17. The apparatus of claim 15, comprising an audio control module communicatively coupled to the audio message module, the audio control module operative to switch to the determined alternate audio connection or an alternate audio resource to improve audio quality in response to an operator command.

18. The apparatus of claim 15, the audio message module operative to generate the operator message with the option to switch to the determined alternate audio connection using a predefined contact number for the alternate audio connection, and receive an operator command to switch to an alternate audio connection using the predefined contact number.

19. The apparatus of claim 15, the audio message module operative to generate the operator message with the option to switch to the determined alternate audio connection and a request to provide a contact number for the alternate audio connection, and receive an operator command to switch to the alternate audio connection using the provided contact number.

20. The apparatus of claim 15, comprising a multimedia conferencing server including the audio management component operative to manage the multiple audio connections for multiple meeting consoles.

* * * * *